United States Patent [19]

Schlosser et al.

[11] Patent Number: 5,662,544
[45] Date of Patent: Sep. 2, 1997

[54] SIDE GEAR RETENTION OF PINION MATES

[75] Inventors: Kraig J. Schlosser, Fort Wayne; Ted J. Kaufman, Ossian Wells, both of Ind.

[73] Assignee: Dana Corporation, Toledo, Ohio

[21] Appl. No.: 532,165

[22] Filed: Sep. 22, 1995

[51] Int. Cl.⁶ .................................................. F16H 48/06
[52] U.S. Cl. ........................... 475/230; 74/459.5; 74/665 F
[58] Field of Search ............................. 475/230, 236, 475/331; 74/665 F, 665 GB, 459.5

[56] References Cited

U.S. PATENT DOCUMENTS

| | | | |
|---|---|---|---|
| 1,279,222 | 9/1918 | Barrow | 475/230 |
| 3,527,120 | 9/1970 | Duer et al. | 475/230 X |
| 3,605,518 | 9/1971 | Haller | 74/459.5 |
| 4,939,953 | 7/1990 | Yasui | 74/459.5 |
| 5,037,362 | 8/1991 | Teraoka et al. | 475/230 X |
| 5,098,355 | 3/1992 | Long | 475/230 X |
| 5,302,158 | 4/1994 | Kwasniewski | 475/160 |
| 5,304,103 | 4/1994 | Schlosser | 475/230 |

FOREIGN PATENT DOCUMENTS

| | | | |
|---|---|---|---|
| 4136955 | 5/1993 | Germany | 475/230 |
| 298228 | 8/1929 | United Kingdom | 475/230 |

*Primary Examiner*—Khoi Q. Ta
*Attorney, Agent, or Firm*—Oldham & Oldham Co., LPA

[57] ABSTRACT

A gear mesh configuration which eliminates independent means for retaining a gear in rotational contact with another. As illustrated by the mesh formed between the cooperating teeth of a side gear and pinion mate in a vehicle differential assembly, the mesh is formed axially and radially inward of the side gear as compared to conventional gear combinations. In this manner, an area is formed in the side gear which is outward of the teeth and which extends around the rear portion of a pinion to retain it in its desired position upon the supporting shaft. Because the gear mesh is now substantially sealed, this configuration also serves to create a limited-slip effect.

10 Claims, 2 Drawing Sheets

SIDE GEAR RETENTION OF PINION MATES

The present invention relates to differential gear assemblies, and more particularly to retaining a differential pinion gear on a shaft.

An inter-axle differential gear assembly allows an output drive axle to rotate at a different speed than an input drive axle. One type of differential assembly transmits torque from the input drive axle to the output drive axle by rotating a case surrounding a pinion gear assembly. This type is known as a "case driven" differential.

Case driven differentials are a distinct class of differentials that transfer torque by rotation of the case surrounding the differential assembly. Torque is transferred to the pinion gear shaft at a portion of the shaft radially outward of the pinion gear. The entire torque load is generally carried by the case. With the case driven differential, the pinion gear is generally retained on its shaft by the case, or by a structure in combination with the case.

In the heavy duty environment, a four pinion gear assembly is generally required in order to transmit substantial amounts of torque through a case driven differential. The four pinion gear assembly distributes the torque over the four pinion gears to reduce tooth stress load on the gears. The pinion gears are generally positioned on a cross-shaped shaft and in a meshing arrangement between a pair of side gears. A "center driven" differential transmits torque directly to the center of a differential assembly, and generally directly rotates the pinion gear shaft, as opposed to rotating a ease. With the center driven differential, the entire torque load is generally carried by the pinion gear shaft.

Several prior art methods to retain the pinion gears on its shaft for center driven differentials have utilized a case to provide additional support to retain the pinion gears. Additionally, it is known in the art to use a threaded cap which is received upon a threaded shaft, or to use a snap ring to retain a pinion gear to a shaft. Under high loads the threaded cap and snap ring are both inadequate methods to retain the pinion gear. A case or other structure is therefore required to assist in retaining the pinion gear on the shaft when the pinion gearing is subjected to high loads. This case is undesirable and adds additional material to the differential, increasing both weight and expense. Further, access to the pinion gears for lubrication is limited. Also, the case reduces the space available for the gears, thus limiting the size of the gears.

A further prior art method of utilizing a retaining cap requires no differential case. It features a non-removable retaining cap and optional washer that is secured to the shaft by means such as welding or press-fitting. However, this retaining cap and washer combination still adds some weight to the overall differential assembly and requires an additional assembly or welding step. Due to the deficiencies identified in the prior art, the following invention is herein presented.

SUMMARY OF THE INVENTION

The present invention provides a gear mesh configuration which eliminates independent means for retaining a gear in rotational contact with another. For example, it provides a simplified means to retain the pinion gear in a differential assembly that eliminates in one instance the differential case, and in another the retaining cap and washer. The present invention involves forming the mesh between the cooperating teeth of the side gear and pinion mate further inward of the side gear thus creating an area of the side gear radially outward of the teeth which extends over at least a portion of the axial outer surface of the side gear further over the pinion mate. The main benefit of this design is that it eliminates thrust washers and inter-axle differential cases in inter-axle differential assemblies by changing the forming of the side gears. The resulting benefits are a reduction in the overall weight of the differential and a cost savings in the areas of material and machining.

Applying the teaching of the present invention to a standard case driven differential, the thrustwashers and the spherical machining performed on the interior of the differential case are eliminated. Rather than machining a spherical radius into the interior of the differential case, the spherical radius can be formed into the side gear where the side gear now retains the pinion mate and absorbs its resulting thrust load. By bringing the pinion mate/side gear mesh internal on the side gear, a limited-slip differential effect is created that utilizes the pumping action to the gear mesh to create pressure in the now nearly sealed gear mesh. This will cause resistance to turning at high relative speeds, creating a limited-slip differential with fewer components than a standard differential. The higher the relative speeds, the more the resistance created by this pumping action. In other words, on a slippery road surface the more one tire spins, the more torque that is transferred to the opposite tractioned tire.

DETAILED DESCRIPTION OF A PREFERRED EMBODIMENTS

Figure 1:
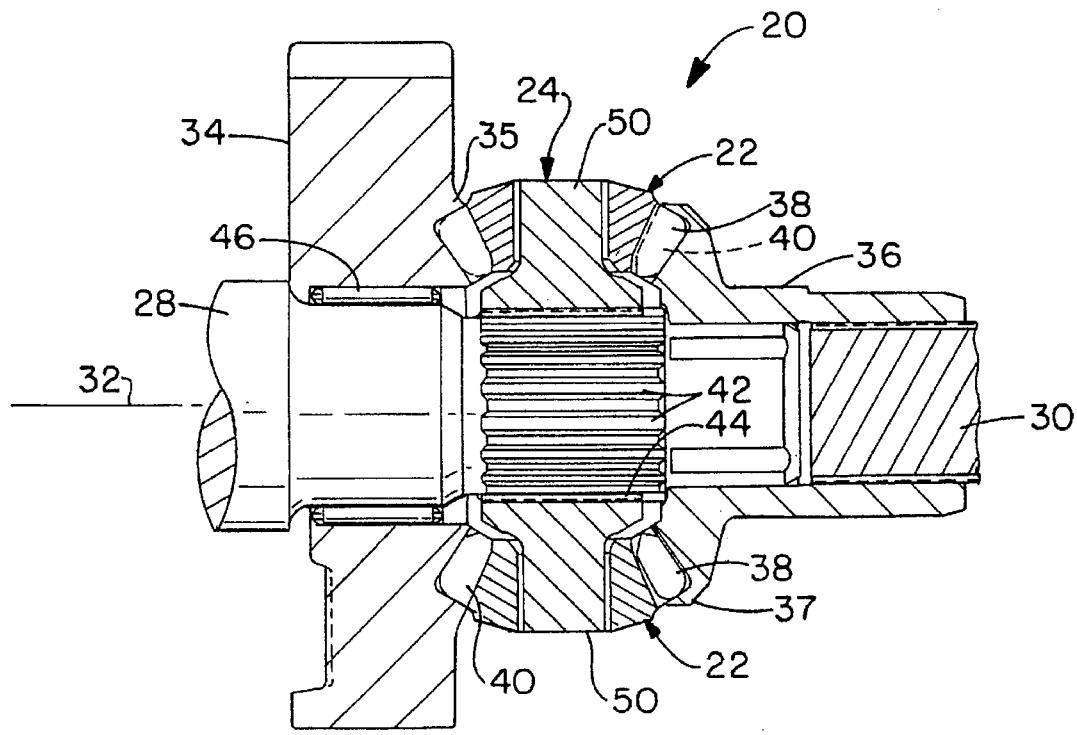
FIG. 1 is a cross-sectional view of a center driven differential gear assembly according to the present invention.

FIG. 1 illustrates an inter-axle differential assembly 20 according to the present invention. The differential assembly 20 includes four pinion gears 22 mounted on a differential frame 24, known also as a differential "cross" or "spider".

Figure 2:
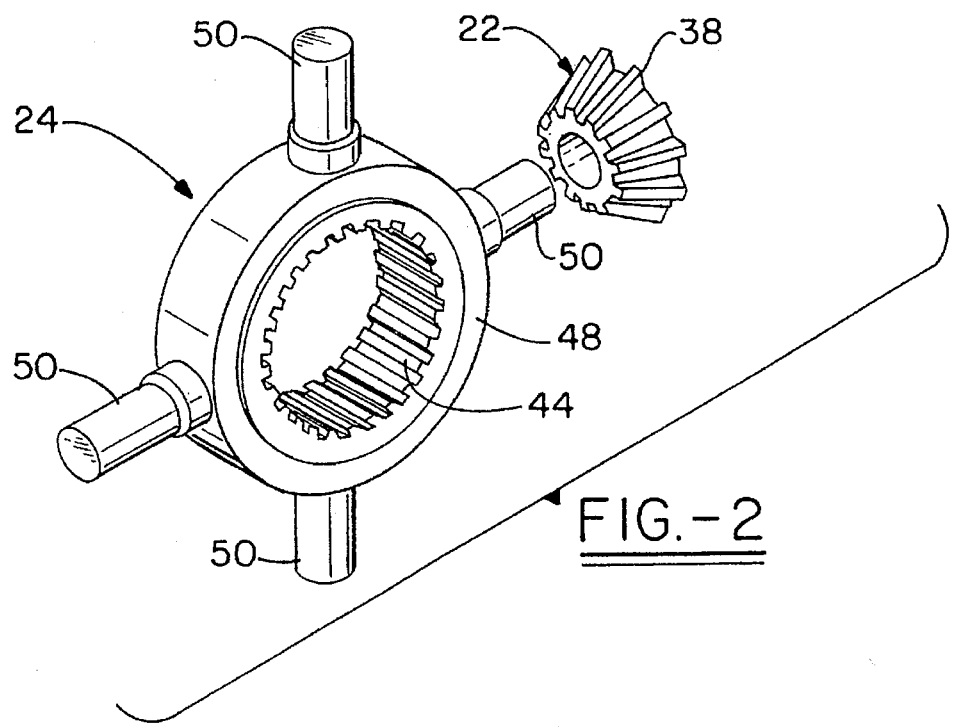
FIG. 2 is an exploded perspective view of a portion of the assembly shown in FIG. 1.

Rotation is transmitted from an input drive shaft 28 and ultimately to an output drive shaft 30. Side gears 34 and 36 are supported about drive shafts 28 and 30, respectively. Disposed between side gears 34 and 36 are pinion gears 22, that mesh with side gears 34 and 36. Differential cross 24 is rotationally fixed to input drive shaft 28, while side gear 34 is slidingly mounted to input drive shaft 28. Additionally, side gear 36 is rotationally fixed to output drive shaft 30. With reference to FIG. 2, differential cross 24 includes a center hub 48 and four pinion or stub shafts 50. Each stub shaft 50 extends radially outward of center hub 48. The axis of each stub shaft 50 extends radially from drive axis 32 (see FIG. 1), and each stub shaft axis lies in a plane disposed perpendicular to drive axis 32.

Pinion gears 22 have a beveled construction interfacing with mating beveled side gears 34 and 36. The pinion gears 22 mesh with side gears 34 and 36 to allow input drive shaft 28 to rotate a different rate than output drive shaft 30. Teeth 38 of pinion gear 22 mesh with corresponding teeth 40 on both sides 34 and 36. Input drive shaft 28 includes exterior splines 42 and differential cross 24 includes complimentary interior splines 44 (see FIG. 2). Exterior splines 42 are received within interior splines 44, preventing rotation of differential cross 24 relative to input drive shaft 28.

Side gear 34 is supported about input drive shaft 28 by a needle bearing 46. Although needle bearing 46 is shown, a bushing could also be used in applications that require lower load limits. Side gear is coupled with output drive shaft 30 by a spline arrangement, similar to that described for cross 24 and input drive shaft 28.

In the first embodiment of the invention the differential assembly 20 is constructed without a case or retaining cap/washer assemblies at the distal end of each stub shaft 50 of differential cross 24. Such were used by the prior art to absorb the thrust load of the pinion gears 22 and retain their position on stub shafts 50. As is shown in FIG. 1 the gear mesh between of side gears 34 and 36 each with pinion mates 22 has been moved radially and axially internal of side gears 34 and 36 creating a relatively sealed gear mesh. In this manner an area 35, 37 of each side gear 34, 36 outward of teeth 40 wraps around the rear portion of each pinion 22 to retain a given pinion 22 in position on its respective stub shaft 50.

Figure 3:
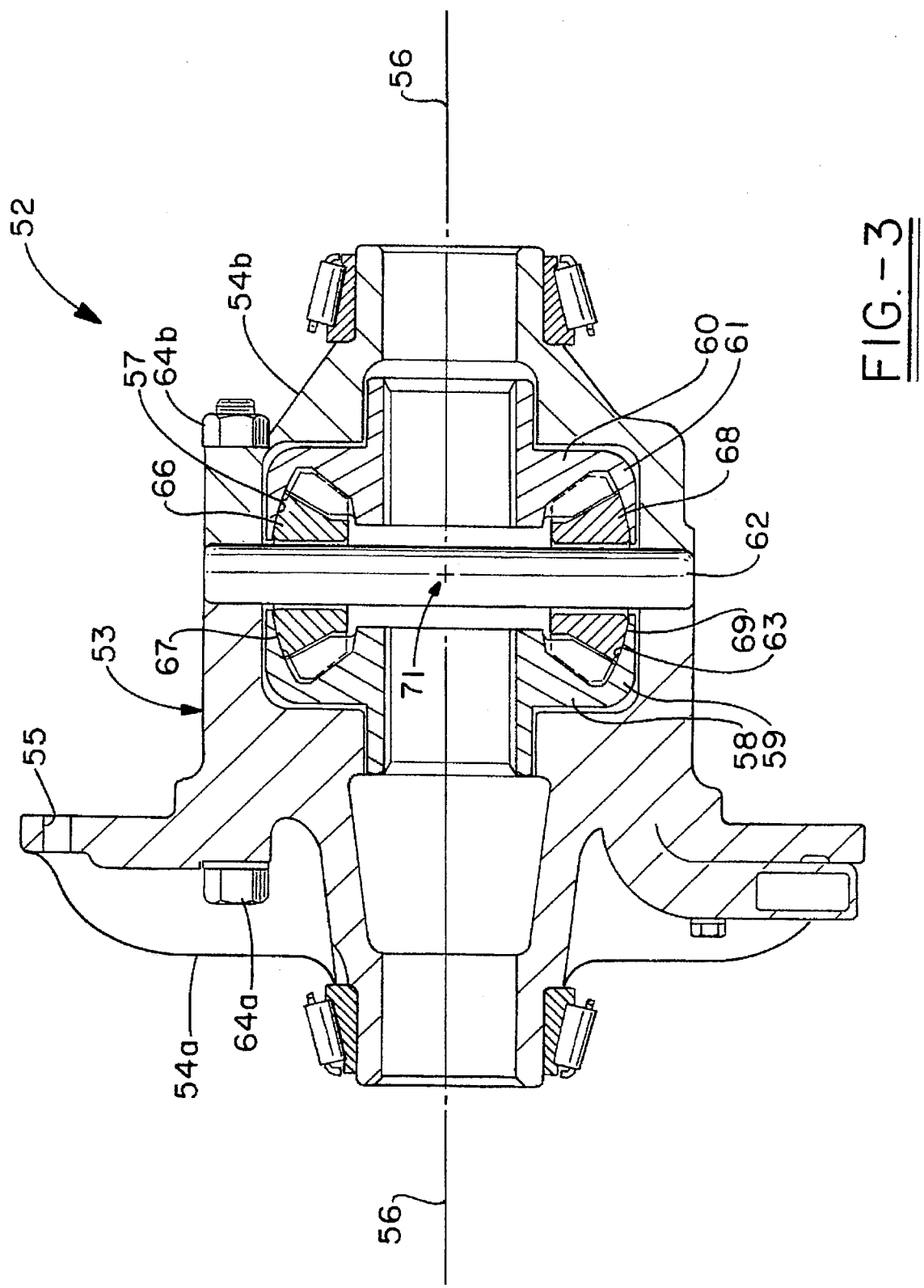
FIG. 3 is a second embodiment cross-sectional view of a case driven differential.

FIG. 3 illustrates a case driven embodiment of the present invention. In this embodiment, the differential 52 includes a case 53 which is adapted to be rotatably supported within an axle housing (not shown) in a known manner. The case 53 includes a cap portion 54a and circumferentially extending flange portion 54b having a plurality of apertures 55 formed therethrough. The apertures 55 are provided to secure a ring gear (not shown) to the ease 53. The cap and flange portions 54a and 54b of case 53 are fastened together with one or more bolt 64a and nut 64b combinations. The ring gear meshes with other components of the drive train of the vehicle so as to rotate the case 53 about an axis 56 within the housing. A pair of side gears 58 and 60 are adapted to be splined onto respective axle shafts (not shown) which extend axially outward from the case 53. A pinion or cross shaft 62 extends through the case 53 between the side gears 58 and 60, transversely to the axis 56. The ends of the cross shaft 62 are received in respective aligned apertures formed through the case 62. A pair of pinion gears 66 and 68 are rotatably mounted on the ends of the cross shaft 62. The pinion gears 66 and 68 mesh with the side gears 58 and 60 in a known manner to form the basic structure of the differential 52.

In this embodiment, the spherical radius normally placed on the differential case is formed into an area (59, 61 respectively) of side gears 58 and 60 outward of the teeth to retain pinion gears 66 and 68 and to absorb the resulting thrust loading. The axial outer surfaces 67, 69 of the pinion gears 66 and 68 have a substantially spherical curvature extending radially outward about the geometric centroid 71 of differential frame or cross shaft 62. The portion of said side gears 59, 61 extending over said axial outer surface of said pinion gear include an interior surface 57, 63 in facial engagement with the pinion gears. This interior surface 57, 63 has a substantially spherical curvature essentially matching the curvature of the axially outer surface 67, 69 of said pinion gears within which there is facial engagement.

The side gears 58 and 60 are brought over pinion gears 66, 68 thereby effecting a limited slip differential that utilizes the pumping action of the gear mesh to cause a volumetric displacement of lubricating fluid and create pressure or a resistance to flow in the now substantially sealed gear mesh. This resistance to rotation at higher relative speeds creates the desired limited-slip differential effect with fewer components than standard differentials. It stands to reason that the more sealed the mesh is between the gear teeth of the side and pinion gears, the greater the resulting limited-slip effect that is created.

In FIG. 1, side gears 34, 36 are configured such that the areas 35, 37 outward of the teeth 40 extend over the rear portion of pinion teeth 40. In contrast, side gears 58, 60 of the case driven differential shown in FIG. 3. are configured such that their outer areas 59, 61 extend beyond the rear portion of pinion teeth 40 and over at least a portion of the axial outer surface. It is to be appreciated that the side gear configurations are not illustrated to use in association exclusively with the particular type of differential (inter-axle or case driven) illustrated in the drawings but rather, each side gear configuration may be used in either type of differential. The extent to which the outward area (35, 37 or 59, 61) of a side gear extends over the teeth and or the axial outer surface of a pinion gear toward a center shaft is primarily a function of the force required to hold a pinion gear in place, wear surface considerations, strains, amount of desired limited slip, etc.

Preferred embodiments of the present invention have been disclosed. A worker of ordinary skill in the art, however, would recognize that certain modifications would come within the scope of this invention. For that reasons the following claims should be studied in order to determine the true scope and contact of this invention.

What is claimed is:

1. A different assembly for a vehicle axle comprising:
  a differential frame having a center hub with a plurality of stub shafts extending radially outwardly of said center hub;
  a pinion gear having an axial inner surface and an axial outer surface received upon each of said stub shafts, said pinion gears being rotatable about said stub shafts and having a plurality of teeth formed in an axial inner surface; and
  at least one side gear having an axis of rotation perpendicular to said pinion gear and a plurality of teeth formed in an axial inner surface such that said teeth rotatably mesh with said teeth of said pinion gear; said side gear having a portion radially outward of said teeth which extends at least partially over said axial outward surface of said pinion gear to retain said pinion gear on said stub shaft.

2. The differential assembly as recited in claim 1, wherein said portion of said side gear extending over said axial outer surface of said pinion gear includes an interior surface in facial engagement with said pinion gear, said interior having a substantially spherical curvature extending radially outward from a centroid of said differential frame, said pinion gear including a matching curvature along the surface in facial engagement with said portion of said at least one side gear.

3. A differential system, comprising:
  an input shaft transmitting rotation, said input shaft including a first side gear rotatably secured about said input shaft;
  a differential frame having a center hub with a plurality of stub shafts extending radially outwardly of said center hub, said hub being fixed to said input shaft, said input shaft adapted to directly rotate a center portion of said differential frame;
  a pinion gear having an axial inner surface and an axial outer surface received upon each of said stub shafts, said pinion gear being rotatable about an axis of said stub shaft;
  an output shaft including a second side gear fixed to said output shaft, said first side gear of said input shaft and said second side gear of said output shaft meshing with said pinion gears to transmit rotation from said input shaft to said output shaft; and said first and second side gears each having a portion radially outward of said teeth which extends at least partially over said axial outward surface of said pinion gear to retain said pinion gear on said stub shaft.

4. The differential assembly as recited in claim 3, wherein said portion of said side gear extending over said axial outer surface of said pinion gear includes an interior surface in facial engagement with said pinion gear, said interior having a substantially spherical curvature extending radially outward from a centroid of said differential frame, said pinion gear including a matching curvature along the surface in facial engagement with said portion of said at least one side gear.

5. A differential system of the type having an input shaft transmitting rotation, said input shaft including a first side gear rotatably secured about said input axle, a differential frame having a center hub with a plurality of stub shafts extending radially outwardly of said center hub, said hub being fixed to said input shaft, said input shaft adapted to directly rotate a center portion of said differential frame, a pinion gear having an axial inner surface and an axial outer surface received upon each of said stub shafts, said pinion gear being rotatable about an axis of said stub shaft, an output shaft including a second side gear fixed to said output shaft, said first side gear of said input shaft and said second side gear of said output shaft meshing with said pinion gears to transmit rotation from said input shaft to said output shaft, wherein the improvement comprises:

said first and second side gears each having a portion radially outward of said teeth which extends at least partially over said axial outward surface of said pinion gear to retain said pinion gear on said stub shaft.

6. The differential assembly as recited in claim 5, wherein said potion of said side gears extending over said axial outer surface of said pinion gear includes an interior surface in facial engagement with said pinion gear, said interior having a substantially spherical curvature extending radially outward from a centroid of said differential frame, said pinion gear including a matching curvature along the surface in facial engagement with said potion of said at least one side gear.

7. A differential assembly for a vehicle axle comprising:
a rotatable differential case;
a cross shaft having a first and a second end secured to opposite sides of a differential case;
a pair of pinion gears each having an axial inner surface and an axial outer surface, rotatably mounted on the first and second ends of said cross shaft;
a pair of side gears having an axis of rotation perpendicular to said pinion gear and a plurality of teeth formed in an axial inner surface such that said teeth rotatably mesh with said teeth of said pinion gear;
said side gear having a portion radially outward of said teeth which extends at least partially over said axial outward surface of said pinion gear to retain said pinion gear on said cross shaft.

8. The differential assembly as recited in claim 7, wherein said portion of said side gear extending over said axial outer surface of said pinion gear includes an interior surface in facial engagement with said pinion gear, said interior having a substantially spherical curvature extending radially outward from a centroid of said differential frame, said pinion gear including a matching curvature along the surface in facial engagement with said portion of said at least one side gear.

9. A differential assembly for a vehicle axle, comprising:
a differential frame having at least 2 pinion shafts;
a pinion gear received upon each of said pinion shafts, said pinion gears being rotatable about said pinion shafts and each having an axial outer surface and a plurality of teeth formed in an axial inner surface; and
at least one side gear having an axis of rotation perpendicular to said pinion gear and a plurality of teeth formed in an axial inner surface such that said teeth rotatably mesh with said teeth of each said pinion gear;
said at least one side gear having a portion radially outward of said teeth which extends at least partially over said axial outward surface of said pinion gear to retain said pinion gear on said stub shaft.

10. The differential assembly as recited in claim 1 wherein said portion of said side gear radially outward of said teeth is the exclusive means for retaining said pinion gear on said stub shaft.

* * * * *